Oct. 20, 1925.
B. J. CRAIG
RECORD CARD
Filed Sept. 7, 1920   3 Sheets-Sheet 1
1,557,924
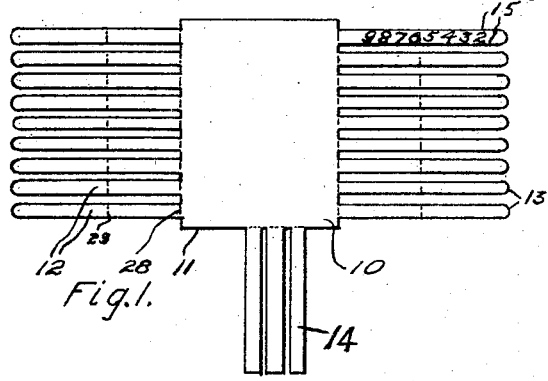
Fig.1.
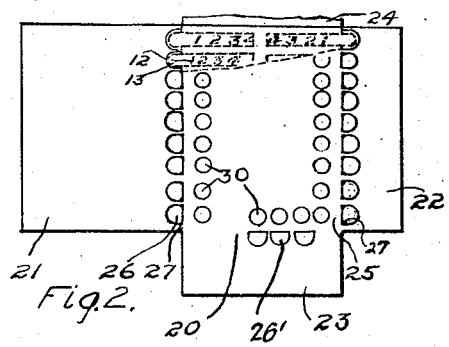
Fig.2.
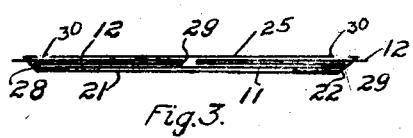
Fig.3.
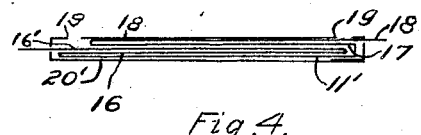
Fig.4.
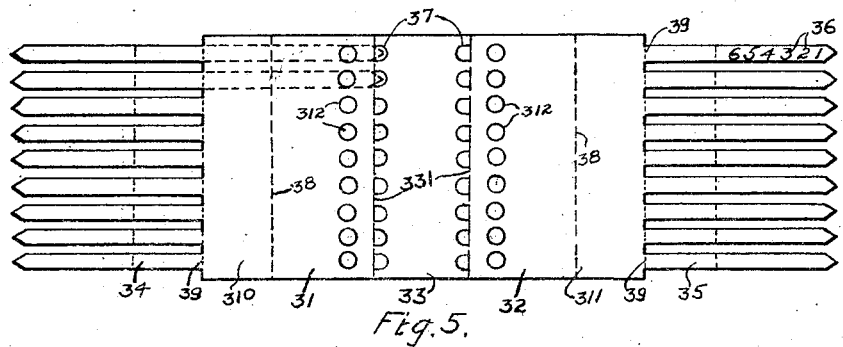
Fig.5.
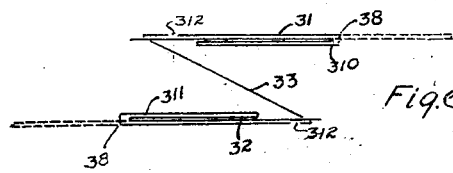
Fig.6.   Fig.7.
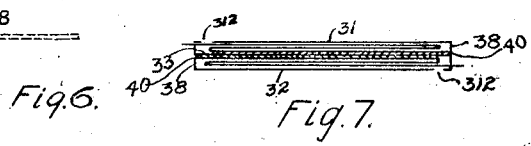
Fig.10.
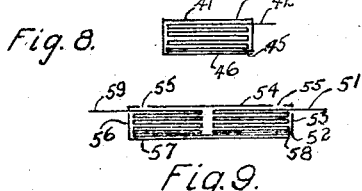
Fig.8.
Fig.9.
INVENTOR
Burnie J. Craig,
By Bates & Macklin
ATTORNEYS Oct. 20, 1925.

B. J. CRAIG

RECORD CARD

Filed Sept. 7, 1920

1,557,924

3 Sheets-Sheet 2

INVENTOR
Burnie J. Craig,
By Bates & Macklin
ATTORNEYS

Oct. 20, 1925.
B. J. CRAIG
1,557,924
RECORD CARD
Filed Sept. 7, 1920 3 Sheets-Sheet 3
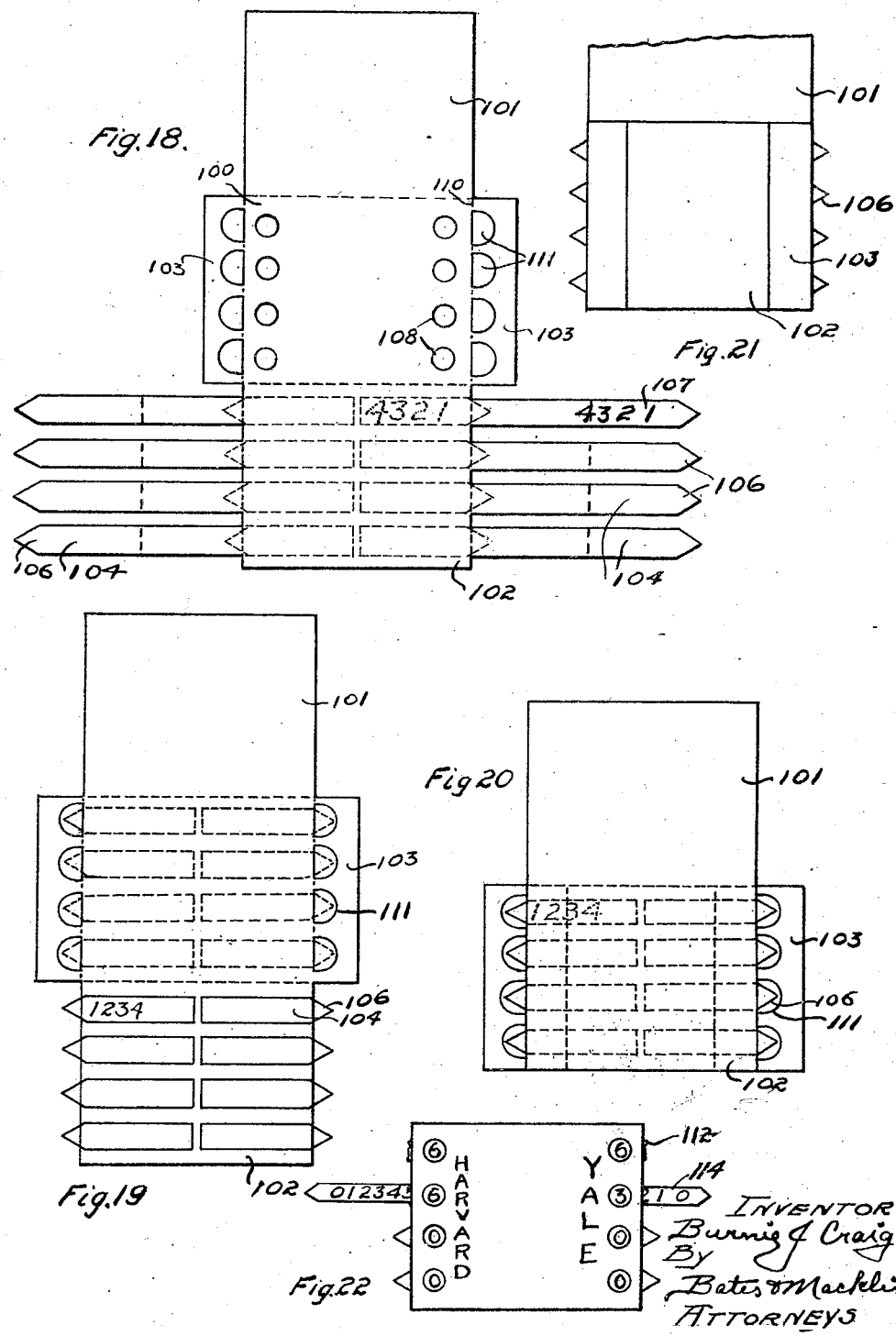

Patented Oct. 20, 1925.

1,557,924

UNITED STATES PATENT OFFICE.

BURNIE J. CRAIG, OF CLEVELAND, OHIO.

RECORD CARD.

Application filed September 7, 1920. Serial No. 408,450.

*To all whom it may concern:*

Be it known that I, BURNIE J. CRAIG, a citizen of the United States, residing at Cleveland, in the county of Cuyahoga and State of Ohio, have invented a certain new and useful Improvement in Record Cards, of which the following is a full, clear, and exact description, reference being had to the accompanying drawings.

This invention relates to record, or score, cards for keeping records or tallies of games or for similar purposes.

One of the objects is to provide a record card or indicator having means thereon for indicating the record or score made in a number of repeated operations; as e. g. in golf, the number of strokes required to make a hole or in baseball the number of hits, runs, errors, etc., made by the contestants.

Another object of the invention is to provide a record card having definite indicia thereon, such indicia being carried by the card itself.

A further object of the invention is to provide in a scorecard means operable to a position to indicate the score. A further object of the invention is to provide a score card having a scoring member operable to a position showing the score made, and which score, when registered, may be prevented from being accidentally altered to show other than the indicated result.

It is to be understood that the embodiments of the invention, shown in the accompanying drawings and described in the following specification, is merely illustrative of some of the means by which my invention can be carried out, and I do not wish to be limited to the specific structure shown.

Figure 11:
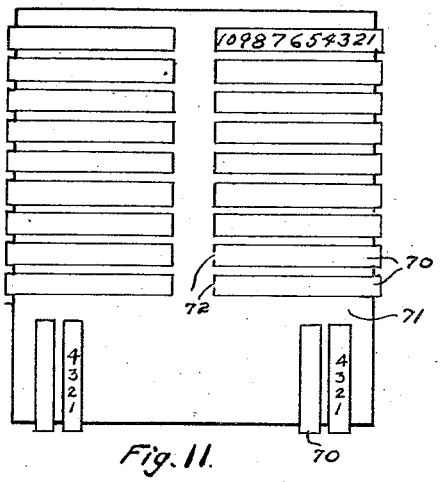
Figure 12:
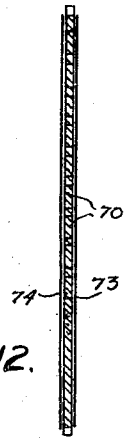
Figure 13:
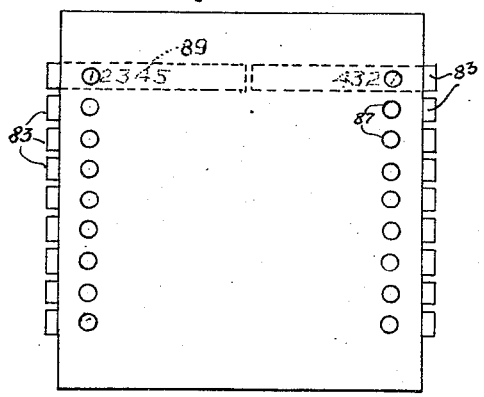
Figures 14, 15:
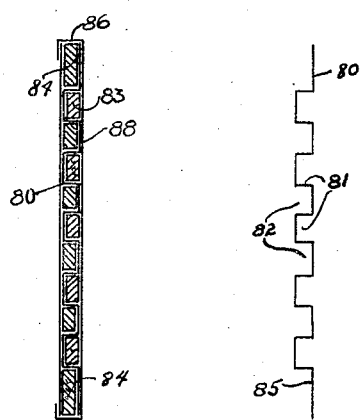
Figure 16:
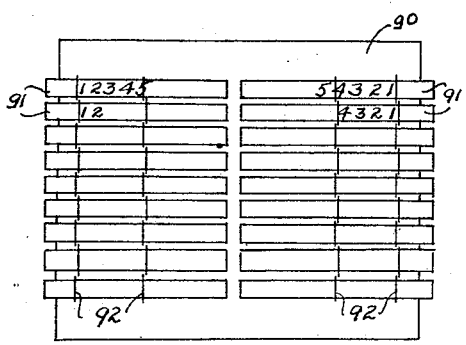
Figure 17:
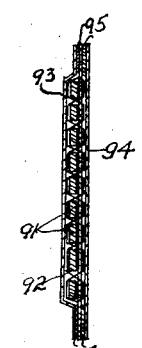

In the accompanying drawings, Fig. 1 is a plan view of the inner blank used in making one type of record card; Fig. 2 is a plan view of the blank for forming outer or cover members, a portion of the folded inner member being shown in dotted lines at the top of the figure; Fig. 3 is a transverse sectional view, showing the completed record card, made from the blanks shown in Figs. 1 and 2; Fig. 4 is a view similar to Fig. 3 of a slightly modified form of record card; Fig. 5 is a plan view of a blank used in making a modified form of record card; Fig. 6 illustrates in cross section a blank, such as shown in Fig. 5, after the same is partly folded; Fig. 7 is a cross section of the completed card made from the blank shown in Fig. 5; Figs. 8, 9 and 10 are transverse sectional views of modified forms of record cards; Fig. 11 is a plan of the inner member of a record card; Fig. 12 is a cross sectional view of a finished card including the inner member shown in Fig. 11; Fig. 13 is a plan view and Fig. 14 a cross section of a further modification; Fig. 15 is a sectional view of one of the elements used in making the record cards shown in Figs. 13 and 14; Fig. 16 is a plan view of a further modification partly completed and Fig. 17 is a cross section of a completed card of the type shown in Fig. 16; Fig. 18 is a plan of a blank used in making a further modification; Figs. 19, 20 and 21 illustrate different steps in the method of constructing a record card from the blank shown in Fig. 18; Fig. 22 shows a completed record card after being partially used.

Referring to the drawings by reference characters, I have shown in Fig. 1 a blank 10 made of paper or other material. This blank may have a rectangular portion 11 having thereon either integral therewith or secured thereto a number of tabs 12, the number of tabs being governed by the use to which the card is to be put. The tabs are shown as having rounded ends 13 for a purpose to be presently described.

The portion 11 may also have tabs 14 secured thereto.

In Fig. 2 I have shown at 20 a type of blank adapted to co-operate with the blank shown in Fig. 1 in making a record card. The blank 20 has flaps 21, 22, 23 and 24, forming the sides and ends. These flaps may be of any suitable width. If desired flaps 22, 23 and 24 may be narrow, while the flap 21 is shown substantially of the area of the body 25 of the blank.

The fold line or the line joining the flaps 21, 22, 23 and 24 to the body 25 is cut or scored at 26 to provide notches through which the tongues or tabs 12 may extend. These cuts or notches may be of any desired shape. I have shown them in Fig. 2 as being substantially semi-elliptical. The inner end of the notches may be rounded as at 27 as I have found that the material is less liable to tear if no abrupt corners are present.

In constructing the record card from the blanks shown in Figs. 1 and 2, the tabs 12 of the blank 10 are folded upon the body 11 adjacent their point of juncture 28 therewith, and are again folded at 29 upon themselves as clearly shown in the assembled record card shown in Fig. 3. The tab 14 will be folded in the same manner as the tabs 12.

The blank 10 folded as just described is placed upon the blank 20 the tongues lying adjacent the body part 25 with the body parts 11 and 25 of the blanks registering. This brings the ends of each tab 12 opposite a notch 26 in the blank 20. The ends of the tabs 14 will register with the notches shown at 26' in Fig. 2. As shown at the top of Fig. 2 where a part of the superimposed blank is shown in dotted lines, the notches 26 may be a trifle larger than the corresponding end of the tabs 12, whereby the tabs need not be inserted in the notches, as the mere folding of the flaps 21, 22, etc. onto the body brings the tabs outside the folded parts. The flaps 22, 23, and 24 are then folded, after which the flap 21 is folded down. The flaps may be secured to the body portions or to each other as desired.

The blank 20 has a series of apertures 30 therein each aligning, in the finished record card, with a tab. The tabs carry numbers or other indicia 15 thereon.

In using the device, as the game progresses, each tab is grasped and pulled to position so that the desired number or mark indicating the score made will register with, and may be seen through, the aperture. For example, in using a record card of the type just described for scoring a game of golf, the tab corresponding to the hole being played may be pulled out to indicate the number of strokes played as they are made, or, if desired, the scorer may wait until he has holed out when he may pull the tab until the proper number, corresponding to the number of strokes played, appears. When the proper number or mark is in registering position the scorer may tear off the end of the tab. This tends to prevent any change in the indicated score and assures that the one registered will not be accidently altered.

In the modification shown in Figs. 1, 2, 3, wherein the tabs are folded intermediate their length and do not overlap each other, the resultant effective length may not provide sufficient room on the tabs for the desired number of characters or figures. In such an event the tabs may be made longer and folded as shown in Fig. 4.

In the modification of Fig. 4 the outer member 20' may be made from a blank similar to the blank shown in Fig. 2, while the inner component corresponds to Fig. 1 except that the tabs are much longer. The body part 11' of the inner member has on one side thereof a set of flaps comprising two parts 16 and 16'. The parts 16 of the flaps are folded onto the body 11' and the part 16' is folded onto the part 16, so that the part 16' lies above the part 16. On the other side the tabs extend from the body 11' and comprise the part 17 overlying the part 16' of the other tabs and then being bent upon themselves to provide the parts 18 which extend through the cover member. It will be noted that the effective length of the tabs may be approximately twice the width of the cover member. The cover member is shown as provided with apertures 19 through which the indicia on the tabs may be read.

In Figs. 5, 6, and 7 I have shown another modification of my invention, wherein the card is made of a single piece of material, comprising sections 31 and 32, which form the front and back, respectively, of the card and are joined by fold lines 331 to a portion 33. Shown as integral with the front and back are a series of tabs 34 and 35 having indicia 36 thereon.

To make a record card from the blank shown in Fig. 5, the tabs 34 and 35 are folded on the lines 39 so that the ends thereof lie above the apertures or holes 37. The portions 31 and 32 together with the tabs, which are now disposed thereon, are next folded on the lines 38, 38 as shown in dotted lines, in Fig. 6. The parts 310, 311 of the blank are then positioned opposite the portion 33, to which they may be glued, as shown at 40, 40, Fig. 7. Apertures 312 provided on the opposite faces of the card allow the numbers on the tabs to be read therethrough.

In the form shown in Fig. 8 the cover 41 and the tabs 42 may be made of one piece of material. The tabs instead of merely extending across the face of the body a single time are folded on themselves a number of times. The tabs do not extend to the inner portion 45 which engages the back 46 and is secured thereto.

Suitable apertures for allowing the indicia on the tabs to be seen are shown at 43. The tabs are shown as extensions from the body and integral therewith. The tabs in this and all other modifications may be entirely separate from one another or may be joined by web portions or the material may be slitted or otherwise weakened to allow those adjoining to be moved as a unit and to allow them to be withdrawn without disturbing adjacent tabs.

The record card shown in Fig. 9 is quite similar to the one shown in Fig. 8 and is made from a single piece of material. Beginning with the tabs 51 the material is folded to provide superimposed layers. From the ends of the tabs 51, indicated at 52, the material extends upwardly as at 53 and across the top 54. The top portion 54 has apertures 55 therein to allow the indicia on the tabs to be read. From the top 54 the material extends downward at 56 and thence entirely across the back 57. It is then bent on itself at 58 and a second series of tabs 59 provided opposite tabs 51.

The device shown in Fig. 10 is made of one piece of material. The base portion 60 has a top 61 integral therewith, and extending from the top is another portion 62 shown as glued at 67 for a part of its length to the said part 60. A series of tabs 63 extend from the portion 62 and these are bent upon themselves at 66 to extend out from the body of the score through slots as shown at 64. Suitable apertures 65 are provided to allow the indicia to be seen. Adhesive shown at 68 may serve to unite the layers 60 and 61.

All the record cards are shown as having considerable thickness but this is due to the fact that I desire to show the relative position of the parts to better advantage. As a matter of fact the record cards may be quite thin. They may be no thicker than the thickness of the number of necessary layers of paper. The side portions, for instance, the parts indicated at 53, 56 in Fig. 9 could be no thicker than a mere creased fold of paper.

In Figs. 11 and 12 a further modification is shown wherein the tabs 70 are cut from the member 71. The said tabs are not removed when cut, in fact they may be united with the main portion 71 by integral parts 72, if desired. After the tabs are cut or scored, a front 73 and a back 74, having apertures through which the indicia on the tabs may be seen, is placed about the body and tab portions and may be suitably secured to allow the tabs to be withdrawn.

The material from which the body 71 and the tabs 70 are made may be a light cardboard having the necessary characteristics as regards stock weight and finish.

The record card, shown in Figs. 13 and 14, is made by folding a strip of material 80 to the form shown in Fig. 15 whereby a series of pockets 81, 82 are formed on opposite sides of the strip. Into each pocket a pair of tabs 83 having suitable indicia 89 thereon are placed. A suitable filler member 84 may be provided for the end pockets 85 and over the strip and inserted tabs, a cover 86 is placed. The cover may be secured in such a manner as to allow the tabs to be drawn out from both sides. The indicia 89 on the tabs may be read through apertures 87 in the face 88 of the outer cover, the apertures extending through the strip 80 of the tabs, wherever necessary.

I have shown in Figs. 16 and 17 a record card having a body portion 90, and upon this adjacent pairs of tabs 91 may be secured. The tabs are shown as held in position by stitching 92, 92 each stitch being shown as spanning one tab. The material used in forming the stitches may be metal or fibre thread or cord and the tension may be adjusted so that the tabs are held firmly in place, but at the same time may be pulled out, as the score is used.

Over the tabs a cover sheet 93 may be secured, and if desired another sheet 94 may be applied to the body 90 on its face opposite that on which the tabs are secured. Suitable apertures will be provided in one cover sheet to allow the indicia on the tabs to be read. The cover sheets 93, 94 may be secured to the body 90 by adhesive as shown at 95.

In Fig. 18 I have shown a blank, from which a record card similar to one shown in Figs. 1 to 4, may be produced from a single piece of material. The blank comprises a body part 100, having on the top and the bottom thereof a pair of flaps 101, 102 shown as of the same area as the body part, while at each side of the body 100 is a short flap 103. Joined to the flap 102 at each side are spaced tabs 104, which are shown as having pointed ends 106. These tabs are provided with indicia 107 which is adapted to be brought into registration, in a manner to be presently described, with apertures 108 in the body 100. The flaps 103 adjacent their fold line 110 are provided with slots 111, which may be semi-circular or of any other suitable shape. Each slot, it will be noted, alines with an aperture 108.

In folding the blank to provide a record card the tabs 104 may be folded on the flaps 102 and then on themselves to the dotted line position shown in Fig. 18 wherein the ends 106 are shown as projecting a slight distance beyond the edge of the flaps 102.

In Fig. 19 the blank is shown in solid lines with the tabs 104 folded on the flaps 102. The next step is to fold the parts so that the flap 102 carrying the tabs lies above the body portion 100, as shown in dotted lines in Fig. 19.

It will be noted in this figure that the pointed ends 106 of the tabs each aline with an aperture, the apertures being shown as larger than the tabs. The next step is to fold the flaps 103 over the flap 102 and the tabs 106, as shown in Fig. 20, wherein the flaps 103 are shown in solid lines before folding and in dotted lines after being folded.

The relative size of the tabs and apertures is such that the mere folding over of the flaps 103 presents the tabs outside the body of the record card so that it is not necessary to insert the tabs through the apertures. In Fig. 21 the flaps 103 are folded to position. This being done, the flap 101 may be folded down and secured in any suitable manner.

In Fig. 22 the completed record card is particularly adapted for scoring a football game and is shown as adapted to be operated to indicate the score made during each quarter. The uppermost tabs 112 are shown as having been withdrawn to present the desired number and then torn off. Other tabs 114 are shown as withdrawn but the end not removed.

If desired, in any embodiment of my invention shown, I may weaken the tabs transversely to facilitate their removal after they are withdrawn to operative position.

Upon the record card I may print suitable advertisements, instructions, rules, or any matter which may be desired.

In any modifications of my invention in lieu of the apertured viewing portions for allowing the indicia on the tabs to be read, I may provide a transparent strip, or a number of transparent portions, which may cover the apertures or may be integral with the body of the record card. If the transparent portion is to be integral the material may be similar to that used in "window" or "outlook envelopes." I have found the use of such transparent viewing portions to be desirable in some instances.

The record card, or a part thereof may, if desired, be made from paper, or other material, which is readily soluble in water so that the torn off strips would be dissolved by rain.

What I claim as my invention is:—

1. A record card comprising a polygonal front portion having a plurality of apertures therein and a polygonal back portion united with the front portion along all edges thereof and having slits along one of the edges at the junction of the front and back portions, and recording tabs extending through said slits and having indicia thereon visible through said apertures.

2. A record card having a body part including front and back portions, one of said portions having an area within which a record may be registered, a plurality of rupturable, movable, members each having one end anchored between the front and back portions, the other end being free, said members being movable to indicating position with respect to said area, said members comprising narrow strips which may be torn after operation to make them useless thereafter for changing the record registered.

3. A record card comprising a body having slits along each side and having movable tabs projecting from said slits, said tabs having one end fixed and the other end free and having indicating characters thereon, said card having apertures in the face thereof arranged so that the characters on said tabs may be brought into registration with said apertures.

4. A record card comprising a cover part having a plurality of tabs thereon, said tabs being folded so that one part thereof is superimposed on another part, said tabs projecting beyond the side of the body part and having indicia thereon, said cover part having apertures therein, and said tabs having characters thereon adapted to be brought into registration with said apertures by movement of each of said tabs.

5. A record card comprising a body part having a plurality of tabs projecting therefrom, each tab having numbers thereon, said body part having viewing areas therein each aligned with a tab, said tabs being folded within the body part and the numbers being arranged so that as the tab is withdrawn, the numbers will be presented beneath the viewing areas, the end of the tab being adapted to be torn off whereby the record may be prevented from being accidently altered.

6. A record card comprising a body part and a cover part, said body part comprising a central portion having a plurality of tabs thereon, said tabs having suitable indicia thereon, said cover part comprising a central portion, flaps on said central portion, there being apertures in the cover part thru which the tabs project, said central portion being provided with apertures thru which the indicia on the tabs may be read.

7. The method of making a record card from a blank having tabs thereon, which comprises folding the tabs to lie upon the body portion, then folding the ends of the body portion and the part of the tabs thereon onto the remainder of the body portion, then folding the said remainder of the body portion to form a central portion and two side portions, and securing certain of said portions together.

8. A record card comprising a single piece of material cut to form a body part and a plurality of tabs, said material being folded to provide in order an outer back portion, a side portion, a top portion, a second side portion, and an inner back portion, said tabs being secured to said inner back portion, parts of said material having slits therein and the tabs being arranged to have their end portions extending through the slits.

9. A record card comprising a single piece of material cut to form a body part and a plurality of tabs, said material being folded to provide in order, a series of tabs at one side, an inner back portion, an outer back portion, a side portion, a top portion, a second side portion, and a series of tabs opposite said first series of tabs, parts of said material having slits therein and the tabs being arranged to have their end portions extending through the slits.

10. A record card comprising a single piece of material cut to form a body part and a plurality of tabs, said material being folded to provide in order, an outer back portion, a top portion, an inner back portion, and a series of tabs projecting from between said portions, parts of said material having slits therein and the tabs being arranged to have their end portions extending through the slits.

11. A blank for a record card comprising a body part having a pair of flaps integral therewith, and of the same size as said body part, one of said flaps having a series of integral tabs at each side thereof, said tabs being spaced apart and having indicia thereon, another pair of flaps on the body part, said flaps having apertures therein adjacent their line of juncture with the body, and said body part having apertures therein in line with the apertures in the flaps.

In testimony whereof, I hereunto affix my signature.

BURNIE J. CRAIG.